(12) United States Patent
Ma (10) Patent No.: US 9,106,659 B2
(45) Date of Patent: *Aug. 11, 2015

(54) DECOUPLING CLUSTER DATA FROM CLOUD DEPLOYMENT

(71) Applicant: MICROSOFT CORPORATION, Redmond, WA (US)

(72) Inventor: Tianchi Ma, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,037

(22) Filed: Feb. 24, 2014

(65) Prior Publication Data

US 2014/0172942 A1     Jun. 19, 2014

Related U.S. Application Data

(63) Continuation of application No. 13/299,104, filed on Nov. 17, 2011, now Pat. No. 8,682,958.

(51) Int. Cl.
*H04L 29/08* (2006.01)
*G06F 9/50* (2006.01)

(52) U.S. Cl.
CPC .............. *H04L 67/10* (2013.01); *G06F 9/5061* (2013.01)

(58) Field of Classification Search
CPC ........ H04L 61/00; H04L 67/10; G06F 9/5061
USPC .................................. 709/201–203, 217–219
See application file for complete search history.

(56) References Cited

U.S. PATENT DOCUMENTS

| 7,047,287 | B2 | 5/2006 | Sim |
| 7,146,532 | B2 | 12/2006 | McCabe |
| 7,587,428 | B2 | 9/2009 | Barbas |
| 7,653,651 | B1 | 1/2010 | Pavlov |
| 7,716,274 | B1 | 5/2010 | Kumar |
| 2003/0105810 | A1 | 6/2003 | McCrory et al. |
| 2008/0294777 | A1 | 11/2008 | Karve et al. |
| 2010/0153454 | A1 | 6/2010 | Rehm |
| 2012/0066670 | A1 | 3/2012 | McCarthy et al. |
| 2013/0061220 | A1 | 3/2013 | Gnanasambandam et al. |
| 2013/0132456 | A1 | 5/2013 | Ma |

OTHER PUBLICATIONS

An Oracle White Paper, "Oracle Cloud Computing", May 2010, 22 pages.
Hoang, Tri Vo., "Assignment Thesis Integrate Cloud Infrastructure in Unified Hosting Environment", Jan. 6, 200Jul. 9, 2009, 72 pages.
Office Action dated Aug. 14, 2013 U.S. Appl. No. 13/299,104.
Notice of Allowance dated Nov. 8, 2013 U.S. Appl. No. 13/299,104.

*Primary Examiner* — Chirag R Patel
(74) *Attorney, Agent, or Firm* — Ben Tabor; Stein Dolan; Micky Minhas (57) ABSTRACT

The present invention extends to methods, systems, and computer program products for decoupling cluster data from cloud deployment. The decoupling facilitates taking down and reattaching a cluster to persisted data as needed. Other embodiments of the invention include resuming a cluster's execution on a different topology and/or different system states based on a persisted data set.

20 Claims, 5 Drawing Sheets

Figure 1A (Persist)

Figure 1B (Resume)

DECOUPLING CLUSTER DATA FROM CLOUD DEPLOYMENT

CROSS-REFERENCE TO RELATED APPLICATIONS

This application is a continuation of U.S. patent application Ser. No. 13/299,104, filed on Nov. 17, 2011, entitled "DECOUPLING CLUSTER DATA FROM CLOUD DEPLOYMENT," which issued as U.S. Pat. No. 8,682,958 on Mar. 25, 2014, and which application is expressly incorporated herein by reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, an entity builds out an infrastructure and runs applications, such as, for example, Web services, "on-premise" within the infrastructure. In other environments, one entity uses another entity's infrastructure to run application on behalf of the entity. For example, one entity can run an application on machines in another entities data center. Running an application in another entities data center can be referred to as running an application "in the cloud".

When applications are run in the cloud, computing resources and storage resources of the data center are allocated to a user. Data centers providing cloud based resources can require an account so that the owner of the cloud resource can bill for resource usage. As such, one desiring to use cloud based resources can establish an account for that purpose.

Once an account is established, setting up a cluster within the cloud typically includes configuring two components, a service (computing resources) and data (storage resources). Users are charged for use of any computing resources until the computing resources are de-allocated. As such, a user essentially rents resources from the owner of the cloud.

Once a cluster is deployed within the cloud, the cluster starts to have its own set of data (including cluster-wide configurations and node/job/task being added). Due to the elastic nature of cloud computing applications, a user may want to temporarily suspend their cluster to avoid charges for computational resources. At the same time, the user does not want to lose their per-cluster data set. Unfortunately, there is a relatively tight coupling between a cluster and its data. This relatively tight coupling prevents suspending a cluster without losing per-cluster data.

Thus, a user is forced to choose either losing their data or keeping their cluster online and continuing to accrue cloud related charges. Further, the shutdown of a cluster can be sudden and/or unexpected, such as, for example, due an error or other unintended cluster operation. In these circumstances, due at least in part to the relatively tight coupling between a cluster and its data, user data is typically lost.

The present invention extends to methods, systems, and computer program products for decoupling cluster data from cloud deployment. In some embodiments, execution of a cluster is resumed from saved cluster data. A cluster of compute resources is deployed within a distributed system. The cluster is deployed for executing a job. A portion of the job is executed on the deployed cluster. The portion of the job utilizes cluster data corresponding to the job. The deployed cluster is taken down prior to completing execution of the job. Taking down the deployed cluster leaves a remaining portion of the job uncompleted. The cluster data corresponding to the job is persisted in an external database in response to taking down the deployed cluster. The external database is separate from the deployed cluster.

The cluster of compute resources is re-deployed within the distributed system subsequent to taking down the deployed cluster. The re-deployed cluster is attached to the persisted cluster data in the external database. Execution of the job is resumed on the re-deployed cluster to complete the remaining portion of the job. Completing the remaining portion of the job utilizes the persisted cluster data.

In other embodiments, execution of a cluster is resumed on a different topology. A command is received to resume execution of a cluster based on a persisted data set. The persisted data set includes a persisted cluster topology used at the time the persisted data set was persisted. The persisted cluster topology persists: a number of nodes in one or more node groups, the number of cores at each node, the memory size at each node, and the naming pattern at each node. Distributed system roles are mapped to a current cluster topology. The current cluster topology indicates one or more of: a current number of nodes in the one or more node groups, a current number of cores at each node, a current memory size at each node, and a current naming pattern at each node.

The persisted data set is accessed from an external database that is separate from the deployed cluster. The persisted cluster topology is aligned with the current cluster topology, including one or more of: adjusting the number of nodes in the one or more node groups in the persisted cluster topology to fit the current cluster topology, adjusting the number of cores at each node in the persisted cluster topology to comply with the current cluster topology, adjusting the memory size at least at each node in the persisted cluster topology to comply with the current cluster topology, and adjusting the naming pattern at each node in the persisted topology to comply with the current cluster topology. The results of aligning the persisted cluster topology with the current cluster topology are persisted in the external database. The cluster is initiated to accept requests.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for decoupling cluster data from cloud deployment. In some embodiments, execution of a cluster is resumed from saved cluster data. A cluster of compute resources is deployed within a distributed system. The cluster is deployed for executing a job. A portion of the job is executed on the deployed cluster. The portion of the job utilizes cluster data corresponding to the job. The deployed cluster is taken down prior to completing execution of the job. Taking down the deployed cluster leaves a remaining portion of the job uncompleted. The cluster data corresponding to the job is persisted in an external database in response to taking down the deployed cluster. The external database is separate from the deployed cluster.

The cluster of compute resources is re-deployed within the distributed system subsequent to taking down the deployed cluster. The re-deployed cluster is attached to the persisted cluster data in the external database. Execution of the job is resumed on the re-deployed cluster to complete the remaining portion of the job. Completing the remaining portion of the job utilizes the persisted cluster data.

In other embodiments, execution of a cluster is resumed on a different topology. A command is received to resume execution of a cluster based on a persisted data set. The persisted data set includes a persisted cluster topology used at the time the persisted data set was persisted. The persisted cluster topology persists: a number of nodes in one or more node groups, the number of cores at each node, the memory size at each node, and the naming pattern at each node. Distributed system roles are mapped to a current cluster topology. The current cluster topology indicates one or more of: a current number of nodes in the one or more node groups, a current number of cores at each node, a current memory size at each node, and a current naming pattern at each node.

The persisted data set is accessed from an external database that is separate from the deployed cluster. The persisted cluster topology is aligned with the current cluster topology, including one or more of: adjusting the number of nodes in the one or more node groups in the persisted cluster topology to fit the current cluster topology, adjusting the number of cores at each node in the persisted cluster topology to comply with the current cluster topology, adjusting the memory size at least at each node in the persisted cluster topology to comply with the current cluster topology, and adjusting the naming pattern at each node in the persisted topology to comply with the current cluster topology. The results of aligning the persisted cluster topology with the current cluster topology are persisted in the external database. The cluster is initiated to accept requests.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud."

Embodiments of the invention include persisting a cluster's data in a database, which is separate from a current deployment. A cluster can run in a stateless mode with corresponding data saves in the online persistence. When the cluster deployment is taken down, data is persisted. When the cluster is re-deployed, even with a potentially different topology, a user can specify to attach to an existing persistence. In response, a persisted data set is accessed and intelligently fit into a current deployment. The cluster's execution can then be resumed.

Accordingly, some embodiments of the invention include decoupling a cluster's data from its online deployment. The decoupling facilitates taking down and reattaching a cluster as needed. Other embodiments of the invention include resuming a cluster's execution on a different topology and/or system states based on a persisted data set.

Figure 1A:
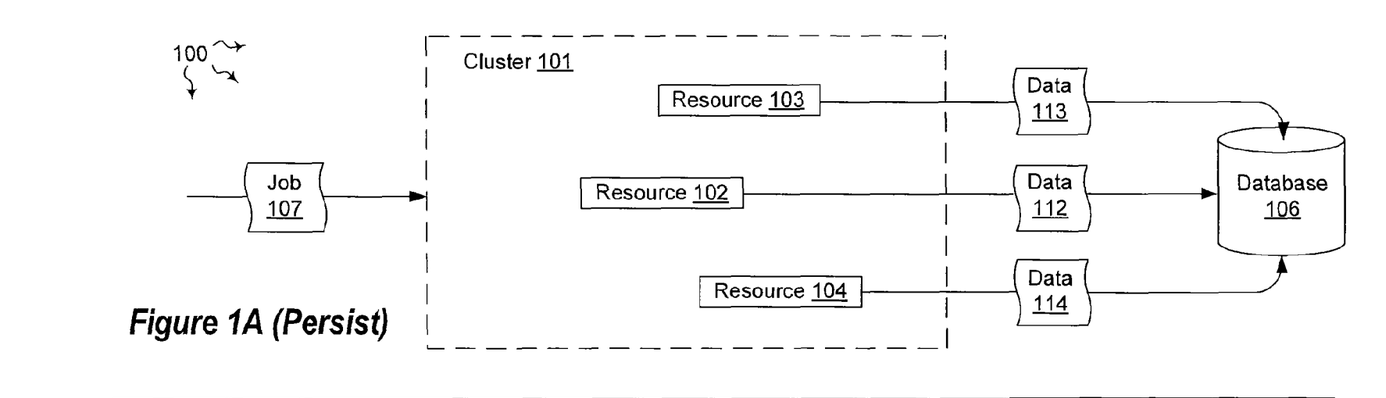
FIGS. 1A and 1B illustrate an example computer architecture that facilitates resuming execution of a cluster from saved cluster data
Figure 1B:
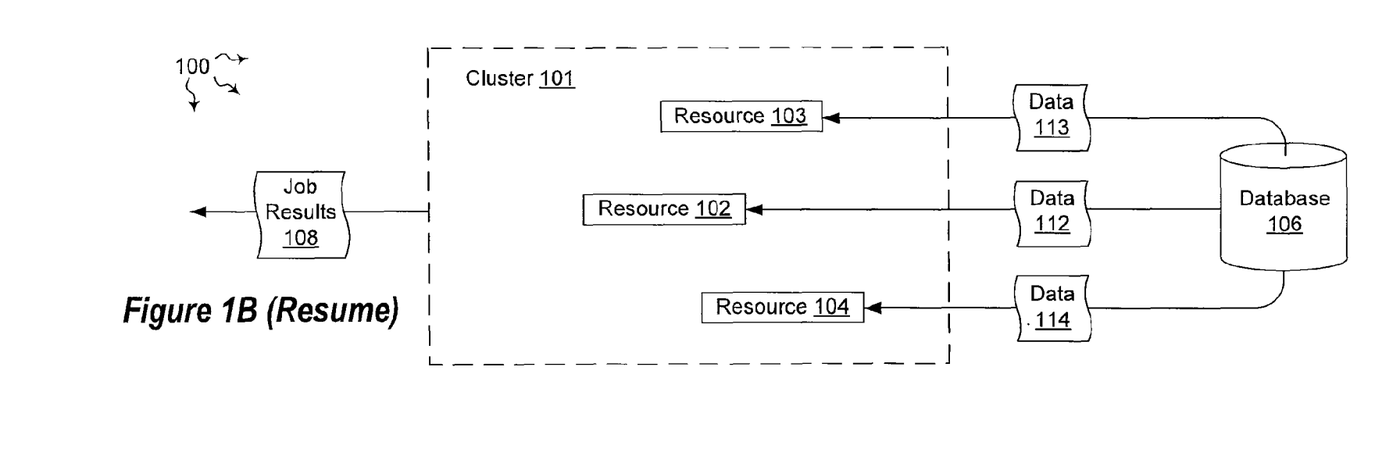

FIGS. 1A and 1B illustrate an example computer architecture 100 that facilitates resuming execution of a cluster from saved cluster data. Referring to FIG. 1, computer architecture 100 includes cluster 101 and database 106. Cluster 101 and database 106 are connected to one another over (or are part of) a network, such as, for example, a Local Area Network ("LAN"), a Wide Area Network ("WAN"), and even the Internet. Accordingly, each of cluster 101 and database 106 and their components (e.g., resources 102, 103 and 104) as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, cluster 101 is configured to receive jobs that execute on resources (e.g., resources 102, 103, and 104) within cluster 101. When jobs complete, job results can be returned. Database 106 is external to cluster 101. In accordance with embodiments of the invention, data utilized in cluster 101 can be persisted to database 106. Cluster 101 can be taken down and later resumed. Upon resumption, cluster 101 can attach to the persisted data saved at database 106. Since database 106 is external to cluster 101, cluster data for cluster 101 is preserved when cluster 101 is taken down.

Figure 2:
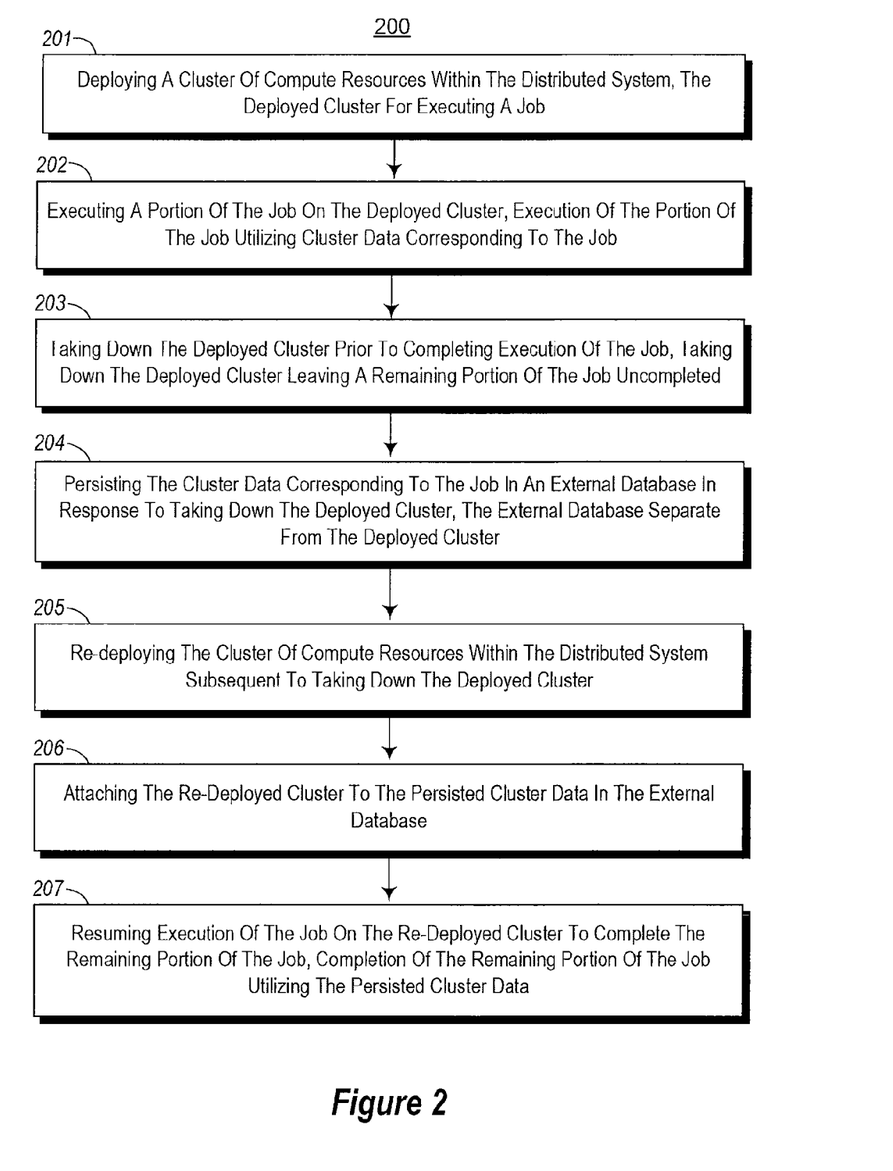
FIG. 2 illustrates a flow chart of an example method for resuming execution of a cluster from saved cluster data

FIG. 2 illustrates a flow chart of an example method 200 for resuming execution of a cluster from saved cluster data. Method 200 will be described with respect to the components and data of computer architecture 100.

Method 200 includes an act of deploying a cluster of compute resources within the distributed system, the deployed cluster for executing a job (act 201). Referring initially to FIG. 1A, cluster 101, including resources 102, 103, and 104, can be deployed within computer architecture 100. Cluster 101 can be deployed to execute job 107. Job 107 can be submitted from another computer system or component within computer architecture 100.

Method 200 includes an act of executing a portion of the job on the deployed cluster, execution of the portion of the job utilizing cluster data corresponding to the job (act 202). For example, a portion of job 107 can be executed on cluster 101. The executed portion of job 107 can utilize cluster data corresponding to job 107. Each resource within cluster 101 can use some portion of cluster data corresponding to job 107. For example, resources 102, 103, and 104 can use cluster data 112, 113, and 114 respectively.

Method 200 includes an act of taking down the deployed cluster prior to completing execution of the job, taking down the deployed cluster leaving a remaining portion of the job uncompleted (act 203). For example, cluster 101 can be taken down prior to completing execution of job 107. Thus, at the time cluster 101 is taken down a portion of job 17 remains uncompleted.

Method 200 includes an act of persisting the cluster data corresponding to the job in an external database in response to taking down the deployed cluster, the external database separate from the deployed cluster (act 204). For example, resources 102, 103, and 104 can persist cluster data 112, 113, and 114 respectively in database 106. Cluster data 112, 113, and 114 can be persisted in response to cluster 101 being taken down.

Method 200 includes an act of re-deploying the cluster of compute resources within the distributed system subsequent to taking down the deployed cluster (act 205). Referring now to FIG. 1B, cluster 101, including resources 102, 103, and 104, can be re-deployed within computer architecture 100. Method 200 includes an act of attaching the re-deployed cluster to the persisted cluster data in the external database (act 206). For example, cluster 101 can be attached to persisted data in database 106. More specifically, resources 102, 103, and 104 can be attached to cluster data 112, 113, and 114 respectively.

Method 200 includes an act of resuming execution of the job on the re-deployed cluster to complete the remaining portion of the job, completion of the remaining portion of the job utilizing the persisted cluster data (act 207). For example, execution of job 107 can be resumed on cluster 101 to complete the remaining portion of job 107. Completing the remaining portion of job 107 can utilize cluster data 112, 113, and 114.

Figure 3:
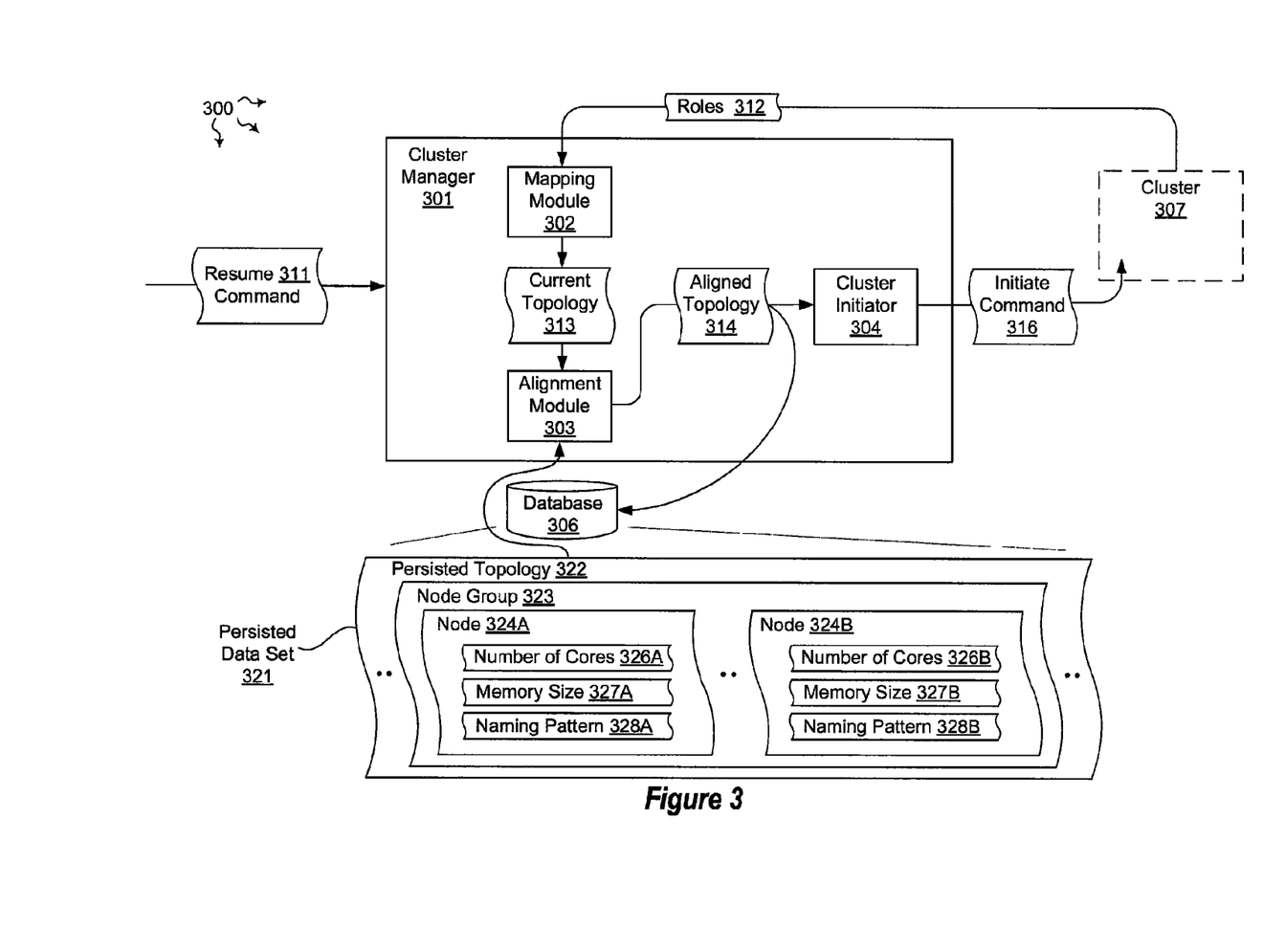
FIG. 3 illustrates an example computer architecture that facilitates resuming execution of a cluster on a different topology.

FIG. 3 illustrates an example computer architecture 300 that facilitates resuming execution of a cluster on a different topology. Referring to FIG. 3, computer architecture 300 includes cluster manager 301, database 306, and cluster 307. Cluster manager 301, database 306, and cluster 307 are connected to one another over (or are part of) a network, such as, for example, a Local Area Network ("LAN"), a Wide Area Network ("WAN"), and even the Internet. Accordingly, each cluster manager 301, database 306, and cluster 307 and their components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In general, cluster manager 301 manages taking down and resuming clusters and cluster resources. As depicted, cluster manager 301 includes mapping module 302, alignment module 303, and cluster initiator 304. Mapping module 302 is configured to map the roles of cluster components in a cluster into a current cluster topology. Alignment module 303 is configured to align a current cluster topology with a persisted cluster topology into an aligned cluster topology. Using an aligned cluster topology, a cluster can be resumed on a cluster topology that differs from the persisted cluster topology. Aligned cluster topologies can also be stored in database 306 as persisted cluster topologies. Cluster initiator 104 is configured to initiate an aligned cluster topology in a cluster.

Database 306 can store persisted cluster topologies in response to clusters being taken down and/or in response to formulation of an aligned cluster topology. Database 306 is external to cluster 307 (and any other clusters). In accordance with embodiments of the invention, data utilized within clusters can be persisted to database 306. Data persisted in database 306 can include: nodes and resource information, jobs and tasks information, cluster-wide settings, action history and monitoring information, and cluster users/password/permissions.

Clusters can be taken down and later resumed. Upon resumption, a cluster can attach to the persisted data saved at database 306. Since database 306 is external to any clusters, cluster data for a cluster is preserved when the cluster is taken down. When the same or a different cluster is (re)activated, the cluster can attach to the persisted data and resume operation.

Figure 4:
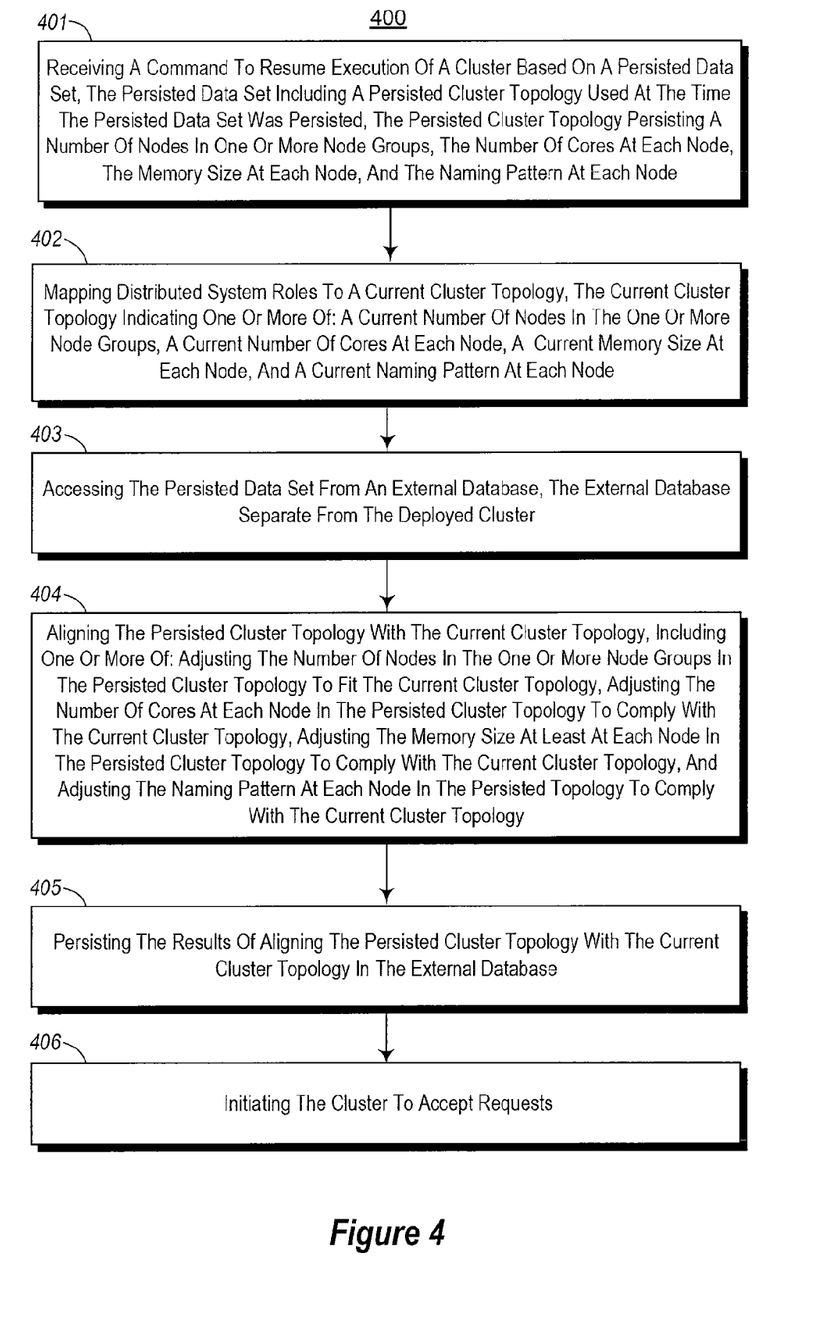
FIG. 4 illustrates a flow chart of an example method for resuming execution of a cluster on a different topology.

FIG. 4 illustrates a flow chart of an example method 400 for resuming execution of a cluster on a different topology. Method 400 will be described with respect to the components and data of computer architecture 300.

Method 400 includes an act of receiving a command to resume execution of a cluster based on a persisted data set, the persisted data set including a persisted cluster topology used at the time the persisted data set was persisted, the persisted cluster topology persisting a number of nodes in one or more node groups, the number of cores at each node, the memory size at each node, and the naming pattern at each node (act 401). For example, cluster manager 301 can receive resume command 311. Resume command 311 can indicate that a cluster is to be restarted based on persisted data 321. Persisted data set 321 includes persisted topology 322. Persisted topology 322 is a topology used at the time persisted data set 321 was persisted in database 306.

Persisted topology 322 includes one or more node groups including node group 323. Each of the one or more node groups includes one or more nodes. For example, node group 323 includes node 324A and node 324B. Persisted data for each node can define the number of cores are the node, the memory size at the node, and then naming pattern used at the node. For example, node 324A defines number of cores 326A, memory size 327A, and naming pattern 328A. Similarly, node 324B defines number of cores 326B, memory size 327B, and naming pattern 328B.

Method 400 includes an act of mapping distributed system roles to a current cluster topology, the current cluster topology indicating one or more of: a current number of nodes in the one or more node groups, a current number of cores at each node, a current memory size at each node, and a current naming pattern at each node (act 402). For example, mapping module 302 can derive roles 312 from cluster 307. Roles 312 can indicate the roles of components in cluster 307. In some embodiments, mapping module 302 reads deployment information for cluster 307 to determine roles 312. Subsequent to driveling roles 312, mapping module 302 can map roles 312 into current topology 313. Current topology 313 can indicate one or more of: node groups in cluster 307, number of nodes in each node group in cluster 307, the number of cores at each node in cluster 307, the memory size at each node in cluster 307, and the naming pattern at each node in cluster 307.

Method 400 includes an act of accessing the persisted data set from an external database, the external database separate from the deployed cluster (act 403). For example, alignment module 303 can access persisted dataset 321 from database 306. Alignment module 303 can also receive current topology 313 from mapping module 302.

Method 400 includes an act of aligning the persisted cluster topology with the current cluster topology, including one or more of: adjusting the number of nodes in the one or more node groups in the persisted cluster topology to fit the current cluster topology, adjusting the number of cores at each node in the persisted cluster topology to comply with the current cluster topology, adjusting the memory size at least at each node in the persisted cluster topology to comply with the current cluster topology, and adjusting the naming pattern at each node in the persisted topology to comply with the current cluster topology (act 404). For example, alignment module 303 can align persisted topology 322 with current topology 313 into aligned topology 314. Aligning persisted topology 322 with current topology 313 can include one or more of: adjusting the number of nodes in the node groups of persisted topology 322 to fit current topology 313, adjusting the number of cores at nodes in persisted topology 322 to comply with current topology 313, adjusting the memory size at nodes in persisted topology 322 to comply with current topology 313, and adjusting the naming pattern at each node in persisted topology 322 to comply with current topology 313.

Method 400 includes an act of persisting the results of aligning the persisted cluster topology with the current cluster topology in the external database (act 405). For example, alignment module 303 can persist aligned topology 314 in database 306. Method 400 includes an act of initiating the cluster to accept requests (act 406). For example, alignment module 303 can also send aligned topology 314 to cluster initiator 304. Cluster initiator 304 can submit initiate command 316 to cluster 307 to initiate cluster 307 in accordance with aligned topology 314. Upon initiation, cluster 307 can accept request (e.g., to perform jobs) from other computing systems and components.

Figure 5:
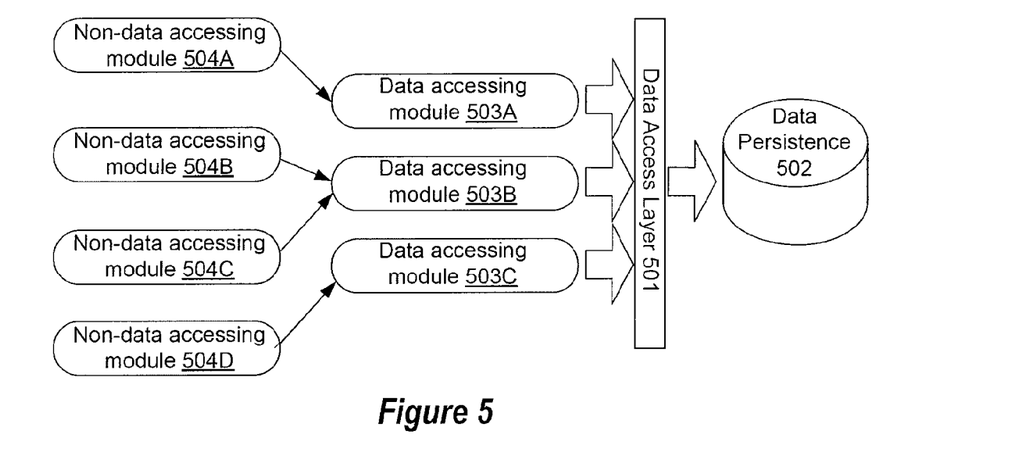
FIG. 5 illustrates an example computer architecture that facilitates decoupling data persistence from cluster modules.

FIG. 5 illustrates an example computer architecture 500 that facilitates decoupling data persistence from cluster modules. In some embodiments, cluster modules are classified into two types. One type of cluster module, such as, for example, data accessing modules 503A, 503B, and 503C, relies on persisted data (e.g., a job scheduler or job monitor). Another type of cluster module, such as, for example, non-data accessing modules 504A, 504B, 504C, and 504D, is driven by incoming requests, messages from other modules and system states (e.g., a node manager). For modules relying on persisted data, a data access layer, such as, for example, data access layer 501, can be situation between the program and its data set, such as, for example, data persistence 502.

Accordingly, for any cooperated operations on the data set, the modules relying on persisted data (e.g., 503A, 503B, and 503C) can synchronize with each other through data access layer 501. Modules driven by incoming requests (e.g., 504A, 504B, 504C, and 504D, can refrain from attempts to directly access or update any data through data access layer 502. Modules driven by incoming requests can also provide a function for modules that rely on persisted data to query the state of any on-going requested operation requested.

Data persistence 502 can include one or more of: nodes and resource information, jobs and tasks information, cluster-wide settings, action history and monitoring information, and Cluster users/password/permission. When a new cluster deployment is created, users can provide a previous account on the persisted data. Based on the previous account, setup on the running environment can be performed to determine the cluster is in a resume mode. As such, a cluster can (continue to) run on a previously saved data set.

A cluster can have several node groups. Each node group can contain a specified number of nodes. Each node can have different hardware settings (e.g., number of cores and memory). A cluster's topology can be defined as the combination of node groups and individual node settings. When a cluster is in the resume mode, it can first stop accepting requests from the outside, so that no new jobs can be submitted for the moment. A saved cluster topology can then be aligned with a current cluster topology.

Topology alignment can include downloading a persisted user table and creating the user table on the cluster with the saves password and permission set. Topology alignment can include adjusting the number of nodes in each node group to fit the current value. Topology alignment can include adjusting the number of cores and memory size for each node, and changing the resource layout according to the adjust cores and memory sizes. Topology alignment can include adjusting other configurations for the nodes (e.g., the naming pattern), to comply with the current settings. Topology alignment can include saving the result back to the data persistence.

After adjustment, a cluster can stop active jobs, such as, for example, any jobs having validating, queued, running, or canceling state. Active jobs are canceled due at least in part to the current system being new. As such, previous on-going actions don't exist. Active jobs can be canceled with a "cluster repdeployed" message. Subsequently, a user can choose to requeue the jobs if they like. Eventually, the cluster can exit resume mode and begin accepting requests from the client.

Embodiments of the invention can be implemented using a combination of products. A cloud computing platform (e.g., Windows® Azure™) can be used to host on-cloud clusters. A distributed database (e.g., SQL Azure™) can be used for data persistence. A store layer can be implemented in a cluster scheduler to act as a data accessing module. Different modules (e.g., job validator, job/task monitor, job/task scheduler, etc.) work cooperatively based on the store layer.

A cluster topology can be defined based on a role instance hierarchy used for cloud-based allocation of resources. Each role can define a basic configuration of the instances (nodes), such as how many cores and memory. A role can then be mapped to a cluster as a node group.

Figure 6:
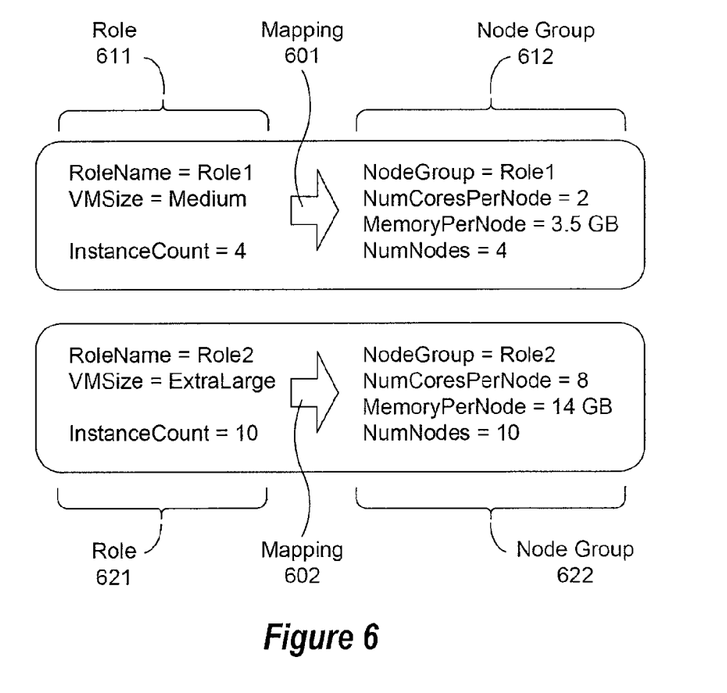
FIG. 6 illustrates example mappings between roles and node groups.

FIG. 6 illustrates example mappings between roles and node groups. As depicted, mapping 601 maps role 611 to node group 612. Similarly, mapping 602 maps role 621 to node group 622. As depicted, a role name can be mapped to a node group, a virtual memory size can be mapped to a number of cores and memory per node, and an instance count can be mapped to a number of nodes. Referring briefly back to FIG. 3, mapping module 302 can implement these and other similar types of mappings.

Mapping can include changing the number of instances (nodes) in each group by updating configuration files for a cloud based deployment. Accordingly, a user has the flexibility to change the number of nodes within each node group when a cluster is deployed. When a cluster is in resume mode, a scheduler can load role information (e.g., the name/configuration/instance number of each role) from the cloud platform role environment. The scheduler compares each role with the corresponding node group previously saved in a database. The scheduler can then adjust the Node table, Node history table, AllocationHistory table, and Resource table to comply with the current configuration.

Accordingly, embodiments of the invention include decoupling a cluster's data from its online deployment. The decoupling facilitates taking down and reattaching a cluster as needed. Other embodiments of the invention include resuming a cluster's execution on a different topology and/or system states based on a persisted data set.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer hardware storage device for use in a computing environment in which a computer system with one or more processors interoperates with one or more other computer systems in a distributed system, the one or more computer hardware storage device having stored computer-executable instructions which, when executed by the one or more processors, implement a method for resuming execution of a cluster from saved cluster data, wherein the method includes:

an act of deploying a cluster of compute resources within the distributed system, the deployed cluster of compute resources defining a current topology for executing a job, and the current topology indicating a current number of nodes in one or more node groups, a current number of cores at each node, a current memory size at each node, and a current naming patter at each node;

an act of executing a portion of the job on the deployed cluster, execution of the portion of the job utilizing cluster data corresponding to the job;

an act of persisting cluster data that represents the current cluster topology of the deployed cluster of compute resources in an external database that is separate from the deployed cluster of compute resources;

an act of taking down the deployed cluster of compute resources after persisting the cluster data for the current cluster topology but prior to completing execution of the job, taking down the deployed cluster leaving a remaining portion of the job uncompleted;

an act of receiving a command to resume execution of the deployed cluster of compute resources in order to complete the job;

in response to the command to resume execution, an act of identifying the persisted cluster data that represents the cluster topology in the external database, and then re-deploying the cluster of compute resources within the distributed system based on the cluster topology that was identified in the persisted cluster data; and an act of resuming execution of the job on the re-deployed cluster of compute resources to complete the remaining portion of the job, completion of the remaining portion of the job utilizing the persisted cluster data.

2. The one or more computer hardware storage device recited in claim 1, wherein the act of deploying a cluster of compute resources within the distributed system comprises an act of deploying a cluster of computer recourses on a cloud-based platform.

3. The one or more computer hardware storage device recited in claim 1, wherein the current topology includes at least two different types of nodes, the at least two different types of nodes including nodes that rely on persisted cluster data and nodes that are driven by incoming requests.

4. The one or more computer hardware storage device recited in claim 1, wherein the act of persisting the cluster data in the external database comprises an act of persisting one or more of: node information, resource information, job information, task information, cluster-wide settings, action history, monitoring information, cluster users, cluster passwords, and cluster permissions.

5. The one or more computer hardware storage device recited in claim 1, the method further comprising:
   an act of receiving account information prior to deploying the cluster of compute resources; and
   wherein the act of re-deploying the cluster of compute resources comprises re-deploying based on permissions corresponding to the account information.

6. The one or more computer hardware storage device recited in claim 1, wherein the act of re-deploying the cluster of compute resources within the distributed system comprises an act of re-deploying the cluster of compute resources by identifying a second, different cluster topology which provides equivalent compute resources to those of the cluster of compute resources for which the cluster data was persisted.

7. The one or more computer hardware storage device recited in claim 6, wherein the act of re-deploying the cluster of compute resources on the second, different cluster topology comprises aligning the cluster topology as identified by the persisted cluster data with the second, different cluster topology.

8. The one or more computer hardware storage device recited in claim 7, wherein the act of aligning the cluster topology as identified by the persisted cluster data with the second, different cluster topology comprises an act of adjusting one or more of: a number of cores at each node in the cluster topology to comply with the second different cluster topology, adjusting the memory size of at least at each node in the cluster topology as identified by the persisted cluster data to comply with the second, different cluster topology, and adjusting the naming pattern at each node in the cluster topology as identified by the persisted cluster data to comply with the second, different cluster topology.

9. The one or more computer hardware storage device recited in claim 7, the method further comprising:
   prior to aligning the cluster topology as identified by the persisted cluster data with the second, different cluster topology mapping one or more cloud-based roles to the second, different topology.

10. The one or more computer hardware storage device of claim 1, wherein the one or more computer hardware storage device comprises the computer system with the one or more processors.

11. One or more computer hardware storage device for use in a computing environment in which a computer system with one or more processors interoperates with one or more other computer systems in a distributed system, the one or more computer hardware storage device having stored computer-executable instructions which, when executed by the one or more processors, implement a method for resuming execution of a cluster on a different topology, wherein the method includes:
   an act of receiving a command to resume execution of a cluster based on a persisted data set, the persisted data set including a persisted cluster topology used at the time the persisted data set was persisted, the persisted cluster topology persisting a number of nodes in one or more node groups, the number of cores at each node, the memory size at each node, and the naming pattern at each node;
   an act of mapping distributed system roles to a current cluster topology, the current cluster topology indicating a current number of nodes in the one or more node groups, a current number of cores at each node, a current memory size at each node, and a current naming pattern at each node;
   an act of accessing the persisted data set from an external database, the external database separate from the deployed cluster;
   an act of aligning the persisted cluster topology with the current cluster topology, including one or more of: (1) adjusting the number of nodes in the one or more node groups in the persisted cluster topology to fit the current cluster topology, (2) adjusting the number of cores at each node in the persisted cluster topology to comply with the current cluster topology, (3) adjusting the memory size at least at each node in the persisted cluster topology to comply with the current cluster topology, and (4) adjusting the naming pattern at each node in the persisted topology to comply with the current cluster topology;
   an act of persisting the results of aligning the persisted cluster topology with the current cluster topology in the external database; and
   an act of initiating the cluster to accept requests.

12. The one or more computer hardware storage device recited in claim 11, the method further comprising:
   an act of preventing the reception of new job requests in response to receiving the command to resume execution of a cluster based on a persisted data set and prior to aligning the persisted cluster topology with the current cluster topology.

13. The one or more computer hardware storage device recited in claim 11, the method furthering comprising:
   an act of storing the persisted data set in the external database prior to receiving the resume command.

14. The one or more computer hardware storage device recited in claim 13, wherein the act of storing the persisted data set in the external database comprises storing one or more of: node information, resource information, job information, task information, cluster-wide settings, action history, monitoring information, cluster users, cluster passwords, and cluster permissions, for the persisted current topology.

15. The one or more computer hardware storage device recited in claim 14, wherein the act of aligning the persisted cluster topology with the current cluster topology comprises:
   an act of downloading cluster users, cluster passwords, and cluster permissions from the external data base; and
   an act of creating the cluster users, cluster passwords, and cluster permissions on the current cluster topology.

16. The one or more computer hardware storage device recited in claim 11, the method further comprising an act of stopping all active jobs on the currently cluster topology subsequent to aligning the persisted cluster topology with the current cluster topology.

17. The one or more computer hardware storage device of claim 11, wherein the one or more computer hardware storage device comprises the computer system with the one or more processors.

18. One or more computer hardware storage device for use in a computing environment in which a computer system with one or more processors interoperates with one or more other computer systems in a cloud-based platform, the one or more computer hardware storage device having stored computer-executable instructions which, when executed by the one or more processors, implement a method for resuming execution of a cluster on a different topology, wherein the method includes:

an act of receiving a command to resume execution of a cluster based on a persisted data set, the persisted data set identifying a persisted cluster topology used at the time the persisted data set was persisted, the persisted cluster topology persisting a number of nodes in one or more node groups, the number of cores at each node, the memory size at each node, and the naming pattern at each node;

an act of preventing the reception of new job requests in response to receiving the command to resume execution of a cluster based on a persisted data set;

an act of accessing distributed system roles being utilized in a current cluster topology;

an act of mapping the distributed system roles to the current cluster topology components, including for each distributed system role:

an act of mapping a role name for the distributed system role to a node group;

an act of mapping a virtual memory size for the distributed system role to a number of cores per node and memory per node; and         an act of mapping an instance count for the distributed system role to a number of nodes;

an act of aligning the persisted cluster topology with the current cluster topology into an aligned topology, including one or more of: (1) adjusting the number of nodes in the one or more node groups in the persisted cluster topology to fit the current cluster topology, (2) adjusting the number of cores at each node in the persisted cluster topology to comply with the current cluster topology, (3) adjusting the memory size at least at each node in the persisted cluster topology to comply with the current cluster topology, and (4) adjusting the naming pattern at each node in the persisted topology to comply with the current cluster topology;

an act of stopping all active jobs on the current topology;

an act of persisting the aligned topology in the external database; and     an act of initiating the cluster to accept requests in accordance with the aligned topology.

19. The one or more computer hardware storage device recited in claim 18, wherein the external database is a distributed database and wherein the act of accessing distributed system roles being utilized in a current cluster topology comprises an act of accessing the distributes system roles from a configuration file.

20. The one or more computer hardware storage device of claim 18, wherein the one or more computer hardware storage device comprises the computer system with the one or more processors.

* * * * *